(12) United States Patent
Frederick et al.

(10) Patent No.: US 10,131,289 B2
(45) Date of Patent: Nov. 20, 2018

(54) ADJUSTABLE VEHICLE CARGO RACK SYSTEM

(71) Applicant: Toyota Motor Engineering & Manufacturing North America, Inc., Erlanger, KY (US)

(72) Inventors: Scott L. Frederick, Brighton, MI (US); Ryan C. Harris, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 12 days.

(21) Appl. No.: 15/272,666

(22) Filed: Sep. 22, 2016

(65) Prior Publication Data

US 2018/0079367 A1     Mar. 22, 2018

(51) Int. Cl.
  *B60R 9/00*    (2006.01)
  *B60R 9/06*    (2006.01)
  *B60R 9/08*    (2006.01)

(52) U.S. Cl.
  CPC .  *B60R 9/06* (2013.01); *B60R 9/08* (2013.01)

(58) Field of Classification Search
  CPC .... B60R 9/06; B60R 9/00; B60R 9/08; B60R 9/10; B60R 13/01
  USPC ....... 224/405, 402, 403, 282, 521, 546, 548, 224/553
  See application file for complete search history.

(56) References Cited

U.S. PATENT DOCUMENTS

| | | | | |
|---|---|---|---|---|
| 4,871,103 A | * | 10/1989 | Martinsson | B60R 9/042 224/310 |
| 5,104,280 A | * | 4/1992 | Ziaylek | B60R 9/0423 280/4 |
| 5,255,951 A | * | 10/1993 | Moore, III | B60R 9/02 224/405 |
| 5,662,254 A | * | 9/1997 | Lemajeur | B60P 3/40 224/405 |
| 5,884,824 A | | 3/1999 | Spring, Jr. | |
| 6,015,074 A | * | 1/2000 | Snavely | B60R 9/042 224/310 |
| 6,460,745 B1 | * | 10/2002 | Weaver | B60R 9/06 211/17 |
| 6,520,393 B1 | * | 2/2003 | Ferguson | B60R 9/042 224/310 |
| 6,561,396 B2 | | 5/2003 | Ketterhagen | |
| 6,698,810 B1 | | 3/2004 | Lane | |

(Continued)

*Primary Examiner* — Brian D Nash
(74) *Attorney, Agent, or Firm* — Christopher G. Darrow; Darrow Mustafa PC

(57) ABSTRACT

An adjustable cargo rack for a vehicle includes a mount for connecting the cargo rack to a vehicle. The cargo rack includes a rack arm having a proximal end pivotally connected to the mount by a pivot shaft. The rack arm is selectively pivotable between a loading position, in which the rack arm extends outboard an outer perimeter of the vehicle and a generally upright first travel position. A cargo support bracket is detachably connected to a distal end of the rack arm. An orientation of the cargo support bracket is adjustable between a first support bracket orientation and a second support bracket orientation. The orientation of the cargo support bracket relative to the rack arm and a location of the pivot shaft relative to the vehicle remain substantially constant when pivoting the rack arm between the loading position and the first travel position.

20 Claims, 12 Drawing Sheets

(56) References Cited

U.S. PATENT DOCUMENTS

| | | | | |
|---|---|---|---|---|
| D494,532 S * | 8/2004 | Reese | ............................ | D12/406 |
| 6,827,244 B1 * | 12/2004 | Stapleton | ................. | B60R 9/042 |
| | | | | 224/310 |
| 7,104,429 B1 * | 9/2006 | Flores | ........................ | B60P 3/40 |
| | | | | 211/207 |
| 7,631,916 B1 * | 12/2009 | Coleman | .................... | B60P 3/40 |
| | | | | 296/3 |
| 7,780,050 B2 * | 8/2010 | Tucker | ..................... | B60R 9/042 |
| | | | | 224/309 |
| 8,833,621 B2 * | 9/2014 | Burkhardt | .................. | B60P 3/40 |
| | | | | 224/403 |
| 8,905,280 B2 | 12/2014 | Martin | | |
| 9,346,409 B2 * | 5/2016 | Pfaeffli | .................... | B60R 9/045 |
| 2007/0170217 A1 * | 7/2007 | Lemoine | ................. | B60P 3/002 |
| | | | | 224/405 |
| 2011/0163142 A1 * | 7/2011 | Farber | ........................ | B60R 9/08 |
| | | | | 224/545 |
| 2014/0027484 A1 * | 1/2014 | Loken | ........................ | B60R 9/10 |
| | | | | 224/497 |
| 2014/0205419 A1 * | 7/2014 | Svaldi | ........................ | B60R 9/06 |
| | | | | 414/800 |
| 2014/0239025 A1 * | 8/2014 | Scott | ........................ | B60R 9/045 |
| | | | | 224/405 |

* cited by examiner

ADJUSTABLE VEHICLE CARGO RACK SYSTEM

BACKGROUND

Light trucks, such as pickup trucks, are capable of transporting its occupants to various locales for participation in outdoor sports, such as skiing and snowboarding, canoeing, bicycling, fishing, and camping. Cargo racks for carrying various cargo, such as sporting goods, are commonly used on a motor vehicle, including pickup trucks, to enhance the load carrying capacity of the vehicle. The cargo racks enable the vehicle to carrying additional cargo that the vehicle may not otherwise be able to carry. The cargo rack may enable a user to forego stowing relatively long cargo, such as a kayak or boat, in a bed of the truck.

When used in connection with a pickup truck, the cargo rack may extend above the bed of the truck at or above a maximum height of the cab of the truck. The height of these cargo racks typically require the user to work over their head when retrieving or stowing cargo on the rack. This arrangement can make it difficult to load and unload large and/or elongated cargo, such as watercraft, onto or off of the cargo rack. Because the cargo is frequently heavy or awkward to handle, maneuvering and positioning cargo onto the cargo rack can be time consuming and difficult.

In an attempt to provide easier loading and unloading of large and/or elongated cargo onto and off of a cargo rack, various loading arrangements have been developed. Prior cargo rack configurations may include mechanical assist systems that aid in retrieving/stowing equipment and supplies from the cargo rack. Such known loading arrangements may be extremely complex and difficult to manipulate. The complexity of these cargo rack mechanisms tend to drive up the cost of the cargo rack and may result in a cargo rack that is relatively heavy and cumbersome to install and remove from the vehicle. Accordingly, there is a need for a cargo rack system capable of being utilized on a variety of different trucks with different bed designs and lengths. It is desirable that the cargo rack be adjustable to carry different objects at different times on the same truck and cargo rack. It is also desirable that the cargo rack not restrict the use of the bulk of the truck bed and that the rack can be quickly mounted and removed from the vehicle. The cargo rack should also be easy to shift or manipulate for loading and unloading cargo, including elongate cargo, such as watercraft.

SUMMARY

Disclosed is a cargo rack system for transporting cargo on a vehicle, such as a pickup truck. The cargo rack system may be configured to transport a variety of cargo, including sporting equipment and various watercraft, such as a kayak or a boat. The cargo rack system may include multiple identically or similarly configured cargo racks attached to the vehicle. Each cargo rack may be spaced on the vehicle a distance from an adjacent cargo rack.

The cargo rack may include a rack arm having one end pivotally attached to a mount for attaching the cargo rack to the vehicle. A cargo support bracket may be attached to an end of the rack arm opposite the mount. The rack arm may include a telescoping mechanism that enables a distance between the cargo support bracket and a pivot shaft to be selectively adjusted.

The cargo rack may include a pivot mechanism that pivotally connects the rack arm to the mount. The pivot mechanism enables the rack arm and cargo support bracket to be selectively positioned in any of several operating positions, including a generally upright first travel position for transporting smaller cargo, such as a kayak, and a second travel position for transporting larger cargo, such as a boat. The pivot mechanism enables the rack arm to be pivoted outboard of the vehicle to a loading position to facilitate loading of cargo onto the cargo support bracket.

The cargo support bracket may be configured to transport different types of cargo using a single cargo support bracket configuration. For example, the cargo support bracket may be used to transport a kayak when the rack arm is arranged in the first transport position and to transport a boat when the rack arm is arranged in the second travel position.

The cargo support bracket may have a generally U-shaped configuration, and include a first support arm attached to and extending radially outward from the rack arm, and a second support arm also attached to and extending radially outward from the rack arm. The first support arm may have a length greater than the second support arm to enable the cargo rack system to transport cargo of differing sizes and shapes using a single cargo support bracket configuration. The longer first support arm may be arranged outboard of the shorter second support arm when transporting smaller cargo, such as a kayak, with the rack arm arranged in the first travel position, and may be arranged inboard of the second support arm when transporting larger cargo, such as a boat, with the rack arm arranged in the second travel position.

An orientation of the first and second support arms may be modified by selective adjusting an orientation of the cargo support bracket relative to the rack arm. When transporting smaller cargo, such as a kayak, the cargo support bracket may be arranged in a first orientation with the longer first support arm arranged outboard of the shorter second support arm. To facilitate loading cargo onto the cargo support bracket, the rack arm may be moved to the loading position by pivoting the rack arm outboard of the vehicle and downward. With the rack arm arranged in the loading position, the cargo maybe loaded onto the cargo support bracket and secured in place with a cargo strap. The rack arm may then be pivoted upright to the first travel position. When transporting larger cargo, such as a boat, the cargo support bracket may be arranged in the second orientation with the longer first support arm arranged inboard of the shorter second support arm. Arranging the rack arm in the second travel position enables the first support arm to provide a platform for supporting the cargo generally over a center of the vehicle.

BRIEF DESCRIPTION OF THE DRAWINGS

The various features, advantages and other uses of the present apparatus will become more apparent by referring to the following detailed description and drawings, in which.

DETAILED DESCRIPTION

Figure 1:
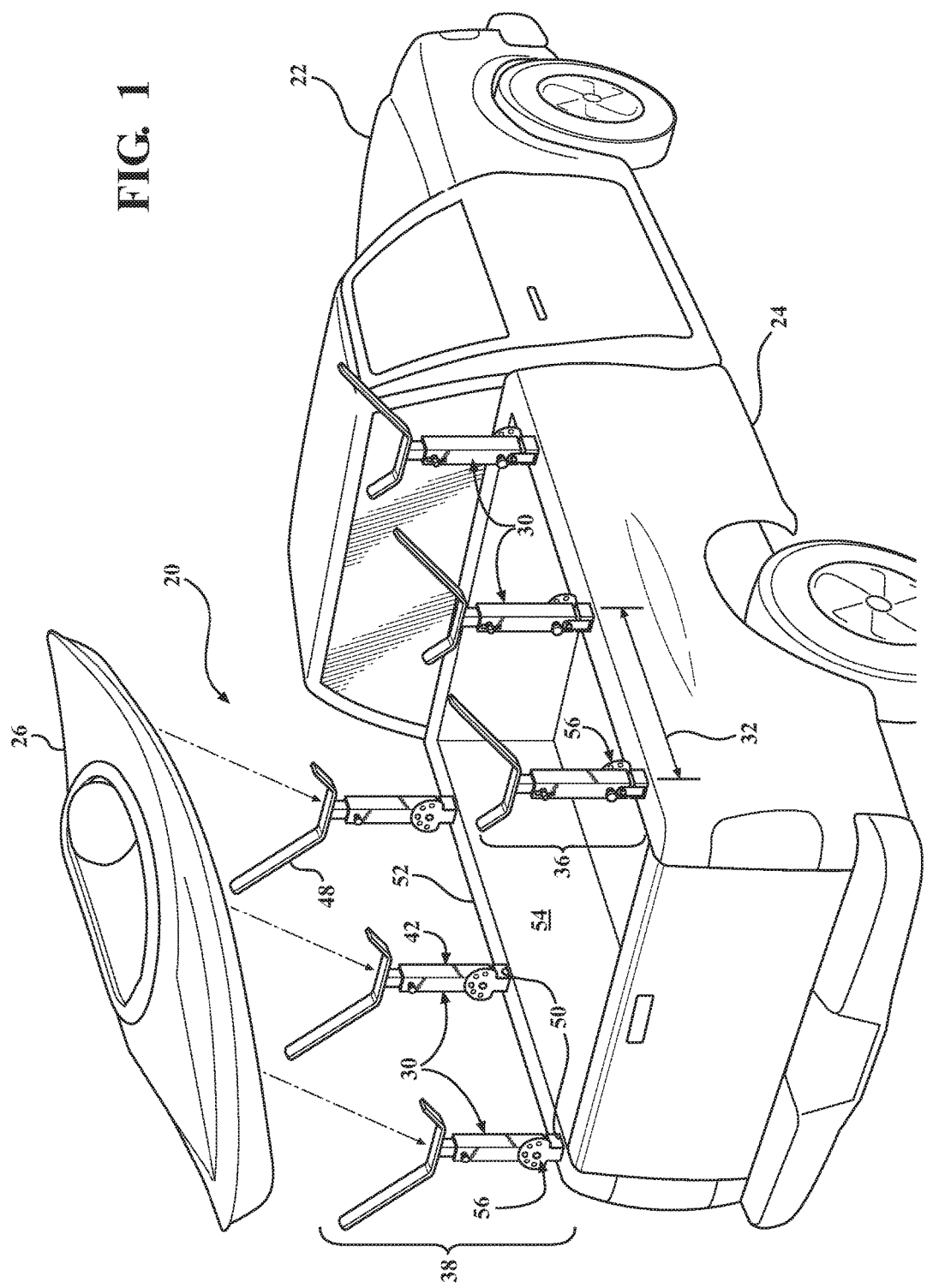
FIG. 1 is a schematic illustration of an adjustable cargo rack system mounted on a vehicle.

An adjustable vehicle cargo rack system for transporting cargo on a vehicle, such as a pickup truck, is disclosed. Previously designed vehicle cargo rack systems typically extend above the bed of the truck at or above a maximum height of the cab of the truck, making it difficult to load and unload large and/or elongated cargo, such as watercraft, onto or off of the cargo rack. Previous designs may include mechanical assist systems for retrieving/stowing cargo on the rack that may be extremely complex and difficult to manipulate and heavy and cumbersome to install and remove from the vehicle. The cargo rack system described herein is an uncomplicated and generally lightweight system configured to transport cargo of various sizes and configurations using a single cargo support bracket configuration. The cargo rack system includes multiple individual cargo racks that separately attach to the vehicle. The cargo rack includes a rack arm pivotally connected to a mount for attaching the cargo rack to the vehicle. A cargo support bracket is attached to an opposite end of the rack arm. When transporting smaller cargo, such as a kayak, the cargo support bracket may be arranged in a first orientation. To facilitate loading cargo onto the cargo support bracket, the rack arm and cargo support bracket may be simultaneously pivoted to a loading position by pivoting the rack arm outboard of the vehicle and downward. With the rack arm arranged in the loading position, the cargo maybe be loaded onto the cargo support bracket and secured in place with a cargo strap. The rack arm may then be pivoted upright to the first travel position. When transporting larger cargo, such as a boat, the rack arm may be arranged in a second travel position and the cargo support bracket in a second orientation. Arranging the rack arm in the second travel position enables the cargo support bracket to provide a platform for supporting the cargo generally over a center of the vehicle.

Referring now to the discussion that follows and also to the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIGS. 1-4, an adjustable vehicle cargo rack system 20 for transporting cargo may be attached to a vehicle 22. Cargo rack system 20 may be used with a variety of differently configured vehicles 22. For purposes of discussion, the configuration and operation of cargo rack system 20 will be described in connection with vehicle 22 configured as pickup truck, with the understanding that cargo rack system 20 may be used in connection other vehicle configurations and is not limited for use only with pickup trucks. In the illustrated example, cargo rack system 20 is shown attached to a bed 24 of vehicle 22, but may alternatively be configured to attach at a different location depending on the particular configuration of the vehicle.

Figure 3:
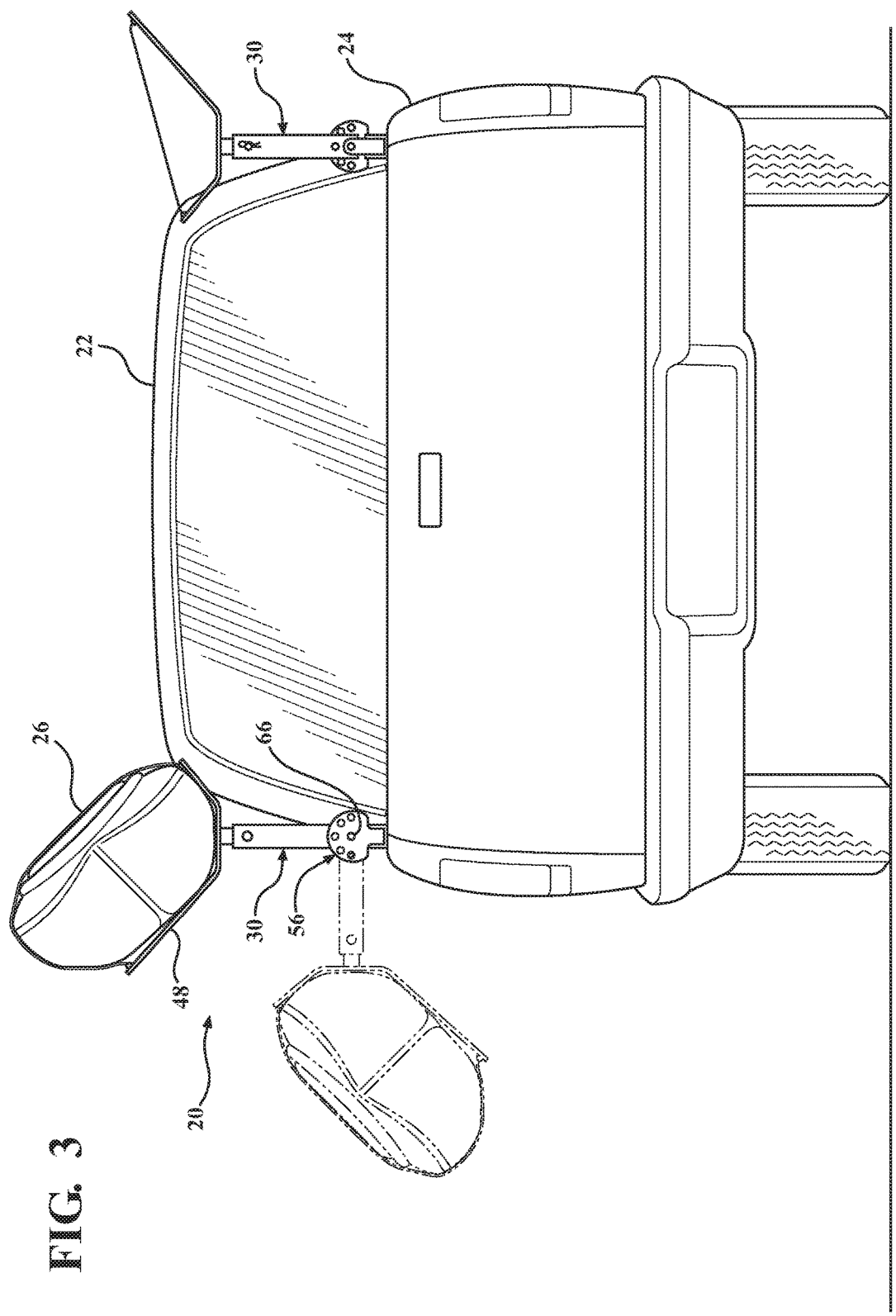
FIG. 3 is a schematic illustration of the cargo rack system moved from the loading position to a first travel position.
Figure 4:
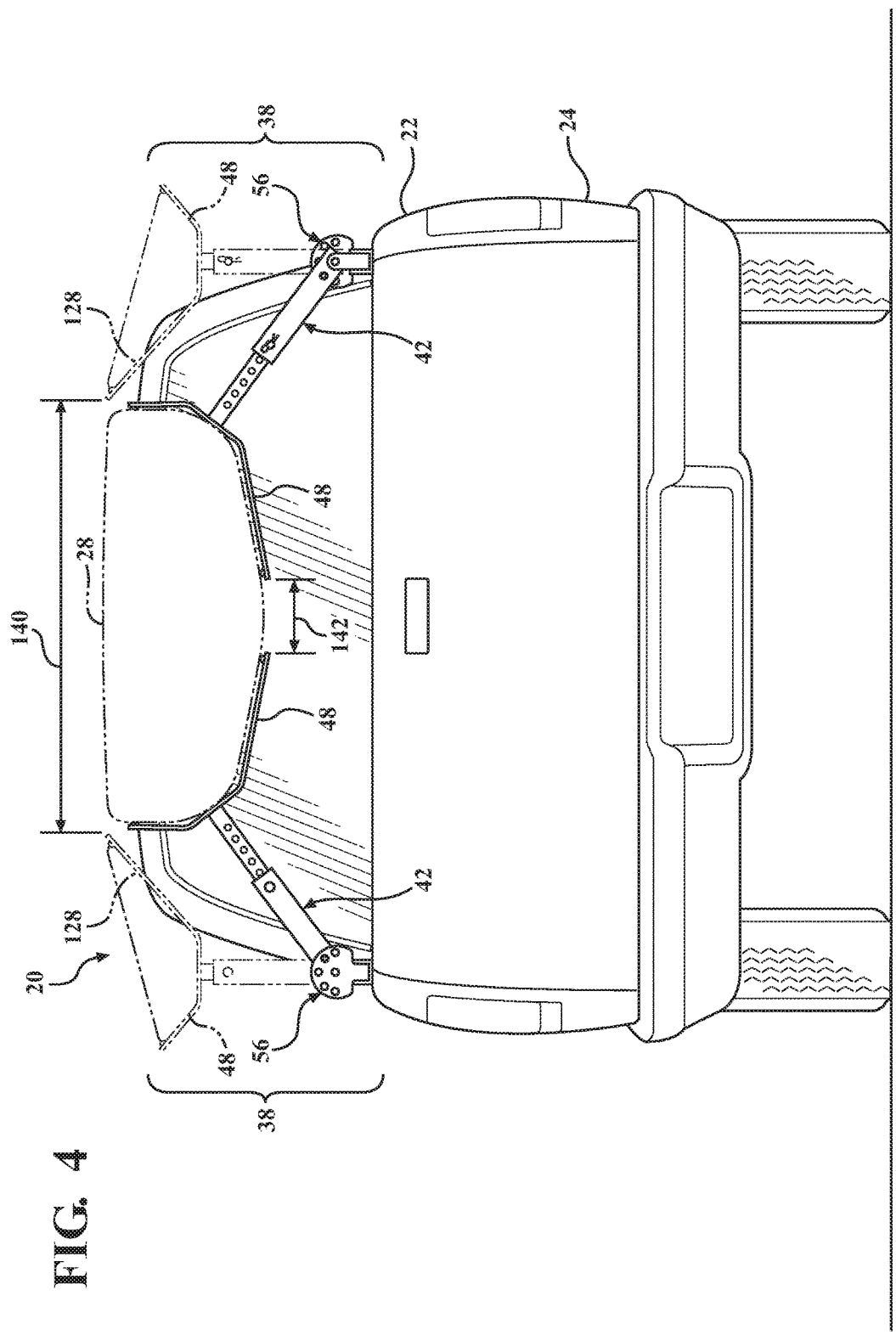
FIG. 4 is a schematic illustration of the cargo rack system arranged in a second travel position with the support bracket arranged in a second support bracket orientation.

Cargo rack system 20 may be configured to transport a variety of cargo, including sporting equipment and various watercraft, such as a kayak 26 (see for example, FIGS. 1-3) or a boat 28 (see for example, FIG. 4). Cargo rack system 20 may include multiple cargo racks 30, each of which may be separately attached to vehicle 22. Each cargo rack 30 may be spaced a distance 32 from an adjacent cargo rack 30. It is not necessary that the spacing between individual cargo racks 30 be uniform. Each cargo rack 30 may be identically or similarly configured.

The number of cargo racks 30 employed with cargo rack system 20 may vary depending on the particular application and/or configuration of vehicle 22. For example, a particular application may utilize two cargo racks 30, whereas another application may employ three or more cargo racks 30. Depending on the size of the cargo being transported, cargo rack system 20 may include a single set of cargo racks 30 positioned along one side of vehicle 22, or two sets of cargo racks 30, each positioned on an opposite side of vehicle 22. For example, a first set 36 of cargo racks 30 positioned along one side of vehicle 22 may be sufficient to transport a small watercraft, such as kayak 26 (see, for example, FIGS. 1-3). On the other hand, transporting larger cargo, such as boat 28, may require use of a second set 38 of cargo racks 30 positioned along a side of vehicle 22 opposite first set 36 (see, for example, FIG. 4). Two sets of cargo racks 30 (i.e., first and second sets 36 and 38) may also be used to transport multiple objects, such as two kayaks 26, with each kayak 26 being mounted on a separate set of cargo racks 30. The ability to vary the number of cargo racks 30 enables cargo rack system 20 to be readily adapted to a particular application and vehicle configuration.

Figure 5:
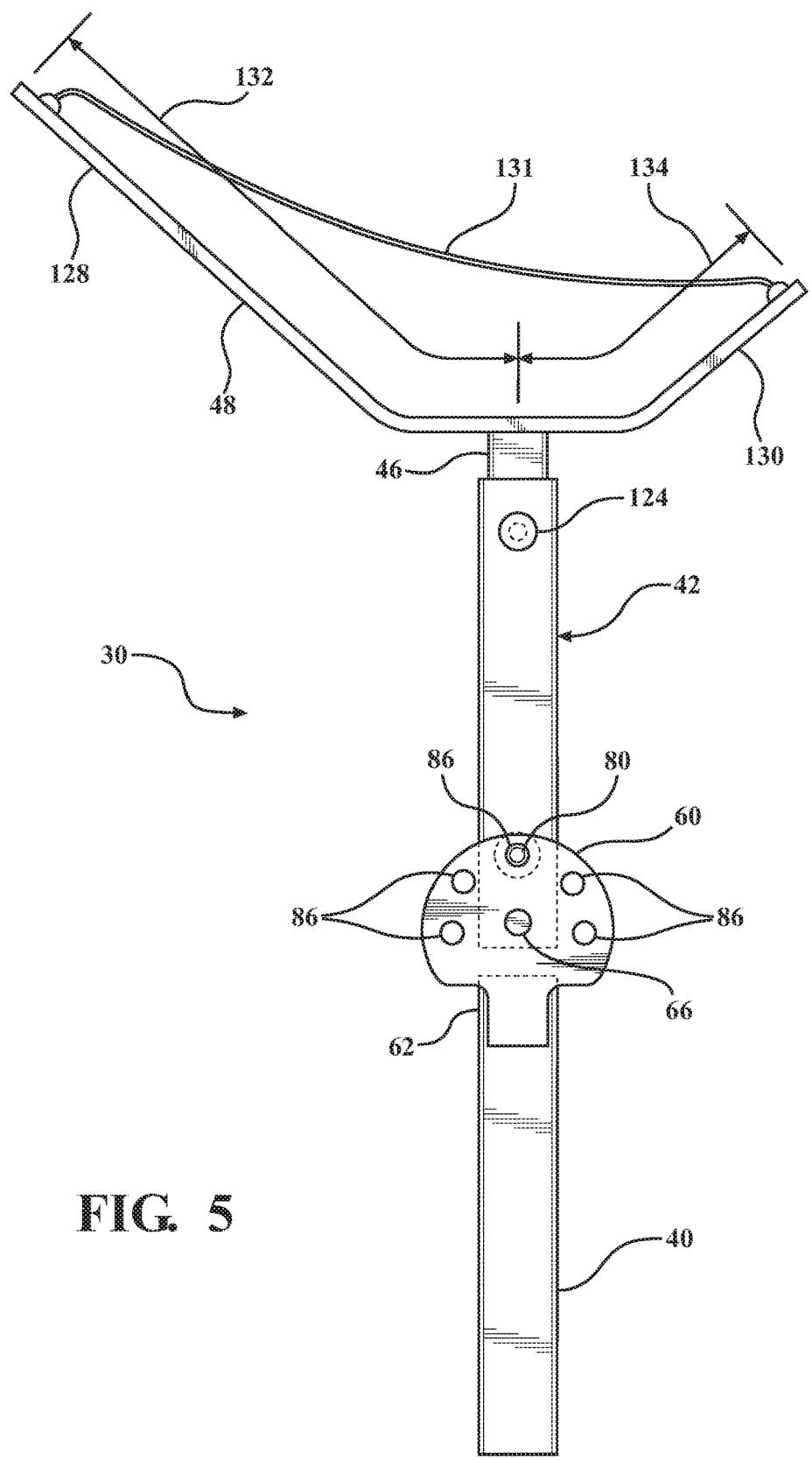
FIG. 5 is a side elevational view of a cargo rack employed with the cargo rack system.
Figure 6:
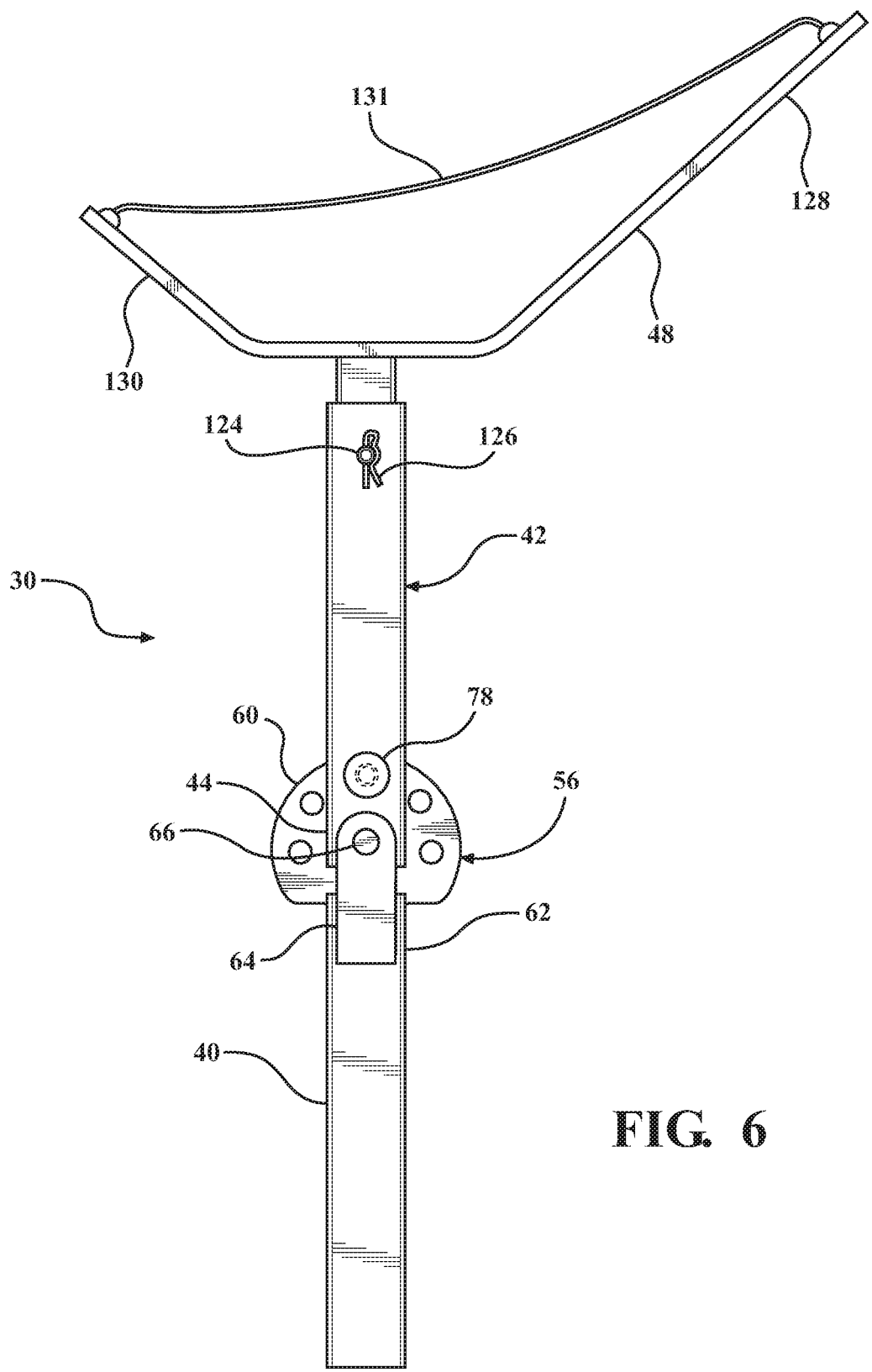
FIG. 6 is a side elevational view of the cargo rack viewed from a perspective opposite that of FIG. 5.

With reference to FIGS. 1, 5 and 6, cargo rack 30 may include a mount 40 for connecting cargo rack 30 to a vehicle 22. A rack arm 42 may have a proximal end 44 pivotally attached to mount 40 and an opposite distal end 46 attached to a cargo support bracket 48. Mount 40 may be suitably configured to interface with a particular mounting structure on vehicle 22. For example, vehicle 22 configured as a pickup truck may include recessed stake pockets 50 formed along a top edge 52 of a sidewall 54 of pickup truck bed 24. Mount 40 may be configured as an elongated tube that can be inserted into stake pocket 50 to secure cargo rack 30 to vehicle 22. Mount 40 may have a cross-sectional shape that generally corresponds to a geometric shape of stake pocket 50. Mount 40 may have a tubular, solid or semi-solid construction, and may include ribs or other types of reinforcing structures. Various types and configurations of connectors may be used to secure mount 40 within stake pocket 50.

With reference to FIGS. 1-4, cargo rack 30 may include a pivot mechanism 56 that pivotally connects rack arm 42 to mount 40. Pivot mechanism 56 enables rack arm 42 and cargo support bracket 48 to be selectively positioned in any of several operating positions, such as illustrated, for example, in FIGS. 1-4. For example, rack arm 42 may be arranged in a generally upright first travel position, as illustrated, for example, in FIGS. 1 and 3. To facilitate loading of cargo onto cargo support bracket 48, pivot mechanism 56 enables rack arm 42 to be pivoted outboard an outer perimeter 58 of vehicle 22 to a loading position, as illustrated, for example, in FIG. 2. Rack arm 42 may also be pivoted inboard the outer perimeter 58 of vehicle 22 to a second travel position, as illustrated, for example, in FIG. 4. Pivot mechanism 56 also enables rack arm 42 to be positioned at various intermediate positions between the loading position and the first and second travel positions.

With reference to FIGS. 5-8, pivot mechanism 56 may include a pivot indexing plate 60 fixedly attached to a proximal end 62 of mount 40. A pivot shaft support member 64 may also be fixedly attached to proximal end 62 of mount 40 on a side opposite pivot indexing plate 60. A pivot shaft 66 pivotally connects proximal end 44 of rack arm 42 to pivot indexing plate 60 and pivot shaft support member 64. Pivot shaft 66 engages a series of co-aligned apertures 68, 70 and 72 in pivot indexing plate 60, pivot shaft support member 64 and rack arm 42, respectively. Pivot shaft 66 may be secured to pivot indexing plate 60 and pivot shaft support member 64 by flaring opposites ends 74 and 76 of pivot shaft 66.

Pivot shaft 66 may include various alternative configurations for enabling rack arm 42 to pivot relative to mount 40. For example, pivot shaft 66 may be configured as a bolt using a nut to secure the pivot shaft 66 to pivot indexing plate 60 and pivot shaft support member 64. It is not necessary that pivot shaft 66 be configured as a single component, but may alternately include multiple connectors for attaching rack arm 42 to pivot indexing plate 60 and pivot shaft support member 64. For example, a first rivet may be used to attach rack arm 42 to pivot indexing plate 60 and a second rivet may be used to attach an opposite side of rack arm 42 to pivot shaft support member 64. Alternate pivot shaft configurations may also be employed, provide the selected configuration enables rack arm 42 to pivot relative to mount 40.

Pivot mechanism 56 may include a pivot locking pin 78 for securing rack arm 42 in a selected operating position. Pivot locking pin 78 may include an elongated locking pin shaft 80 that slidably engages a pair of co-aligned apertures 82 formed in rack arm 42. A distal end 84 of locking pin shaft 80 may be selectively engaged with any of a series of pivot detents 86 formed in pivot indexing plate 60. Pivot detent 86 may include various configurations, such as, for example, a recessed indentation formed in pivot indexing plate 60 or an aperture extending thru pivot indexing plate 60. Pivot detent 86 is shown configured as a thru aperture in the illustrated example.

Figure 7:
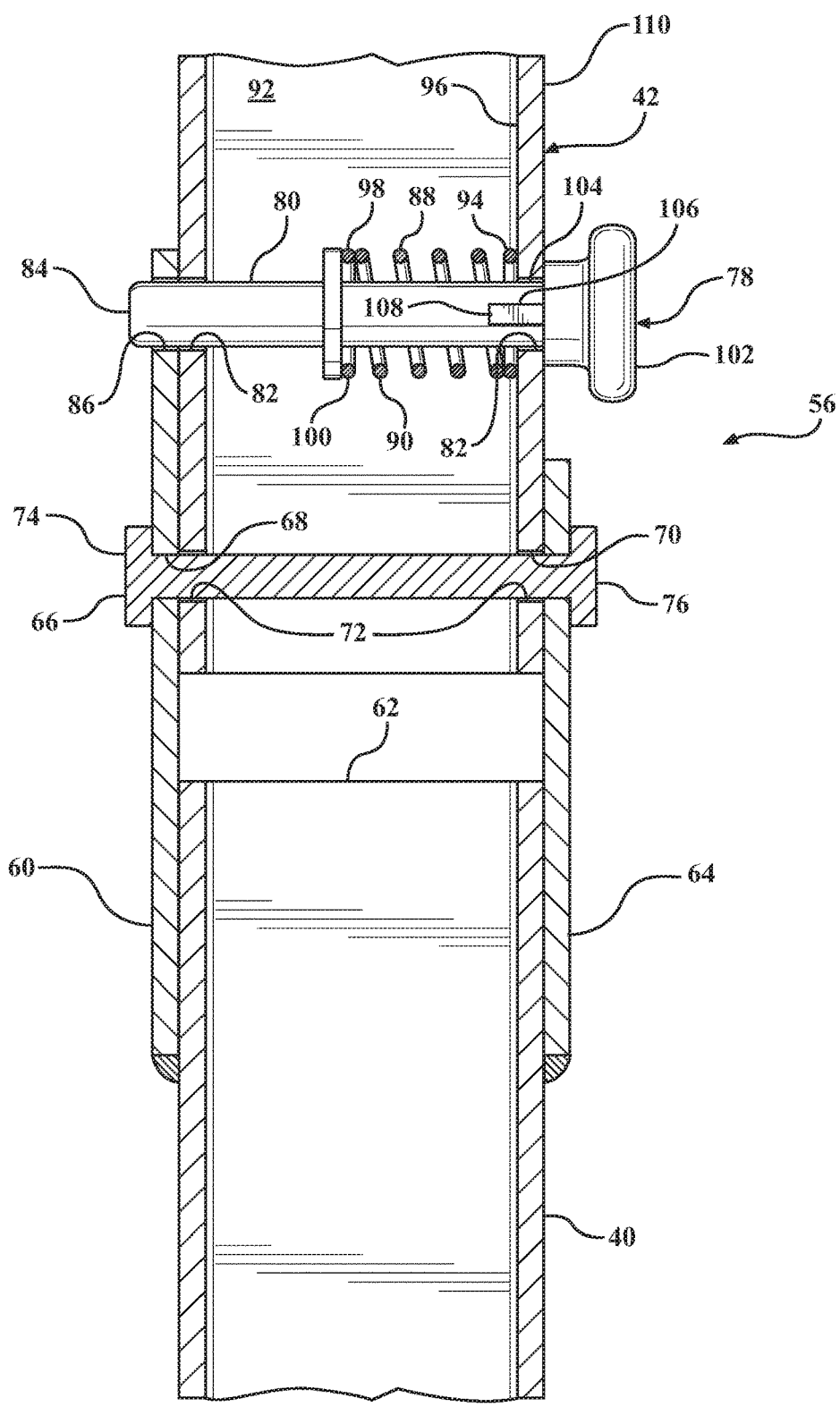
FIG. 7 is a partial cross-sectional view of a pivot mechanism for pivoting the cargo rack between multiple operating positions, with a pivot locking pin arranged in a locked position.
Figure 8:
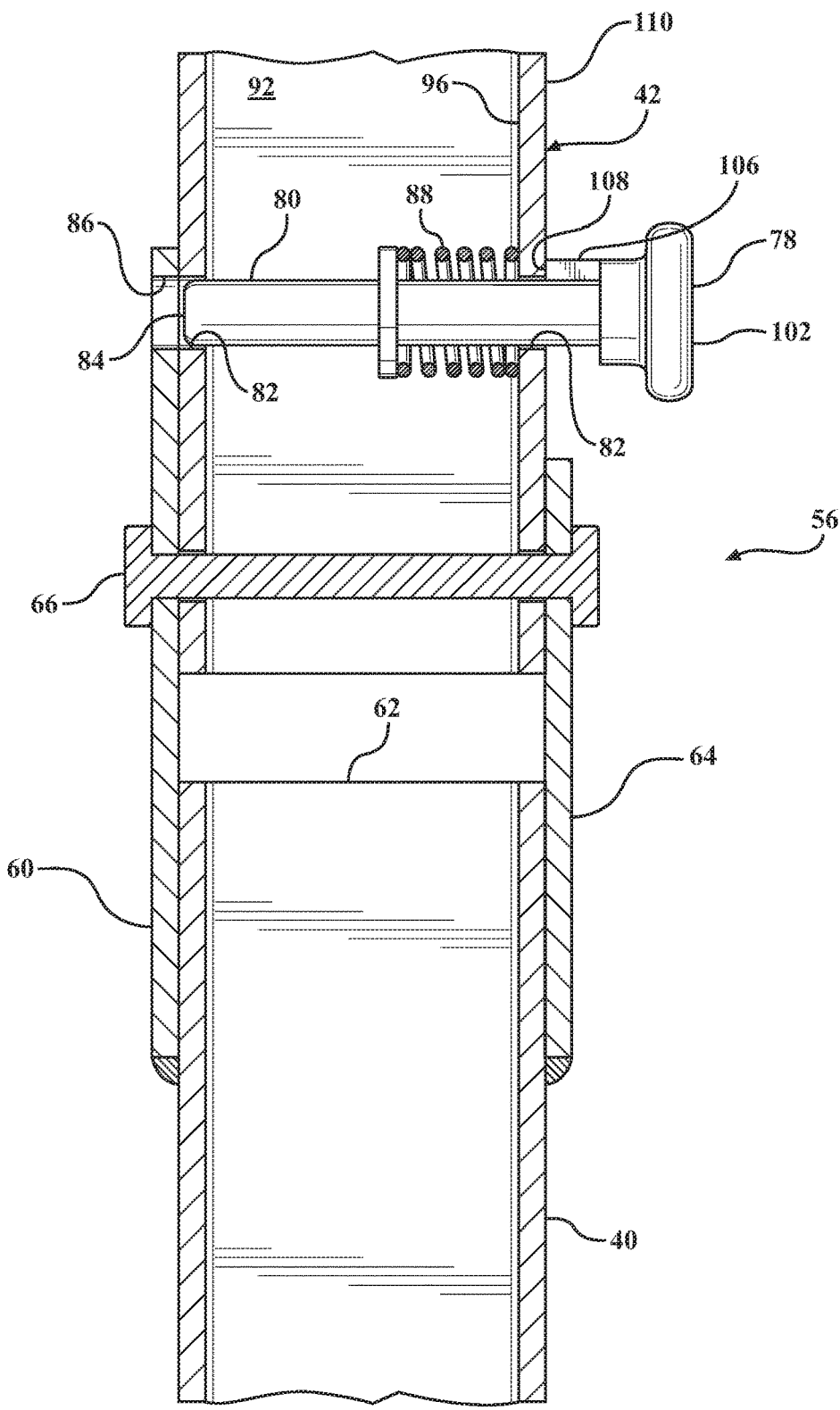
FIG. 8 is a partial cross-sectional view of the pivot mechanism with the pivot locking pin arranged in an unlocked position.

Pivot locking pin 78 may be selectively moved between a locked position, in which locking pin shaft 80 engages a selected pivot detent 86 in pivot indexing plate 60, as shown, for example, in FIG. 7, and an unlocked position, in which locking pin shaft 80 is disengaged from pivot detent 86, as shown, for example, in FIG. 8. Disengaging locking pin shaft 80 from pivot detent 86 enables rack arm 42 to be pivoted about pivot shaft 66. Each pivot detent 86 corresponds to a particular operating position of rack arm 42.

A biasing member 88, such as a coil spring 90, may be provided for urging locking pin shaft 80 toward the locked position. Biasing member 88 may be located in an internal cavity 92 of rack arm 42. An end 94 of biasing member 88 may engage an inside surface 96 of rack arm 42 and an opposite end 98 may engage a flange 100 extending radially outward from locking pin shaft 80.

Pivot locking pin 78 may include a handle 102 attached to a proximal end 104 of locking pin shaft 80. Handle 102 provides a convenient handhold for a user to grasp when moving pivot locking pin 78 from the locked position to the unlocked position.

Locking pin shaft 80 may include a stop 106 for maintaining locking pin shaft 80 in the unlocked position. Stop 106 may be formed as a raised protrusion extending radially outward from locking pin shaft 80. Stop 106 passes through a slot extending radially outward from aperture 82 in rack arm 42 when locking pin shaft 80 is arranged in the locked position (as shown, for example, in FIG. 7). An end 108 of stop 106 may engage an outer surface 110 of rack arm 42 when pivot locking pin 78 is arranged in the unlocked position (as shown, for example, in FIG. 8). Locking pin shaft 80 can be maintained in the unlocked position by rotating handle 102 to move stop 106 out of alignment with the slot in rack arm 42. Locking pin shaft 80 may be returned to the locked position by rotating handle 102 to align stop 106 with the slot in rack arm 42, thereby enabling locking pin shaft 80 to move to the locked position.

Figure 9:
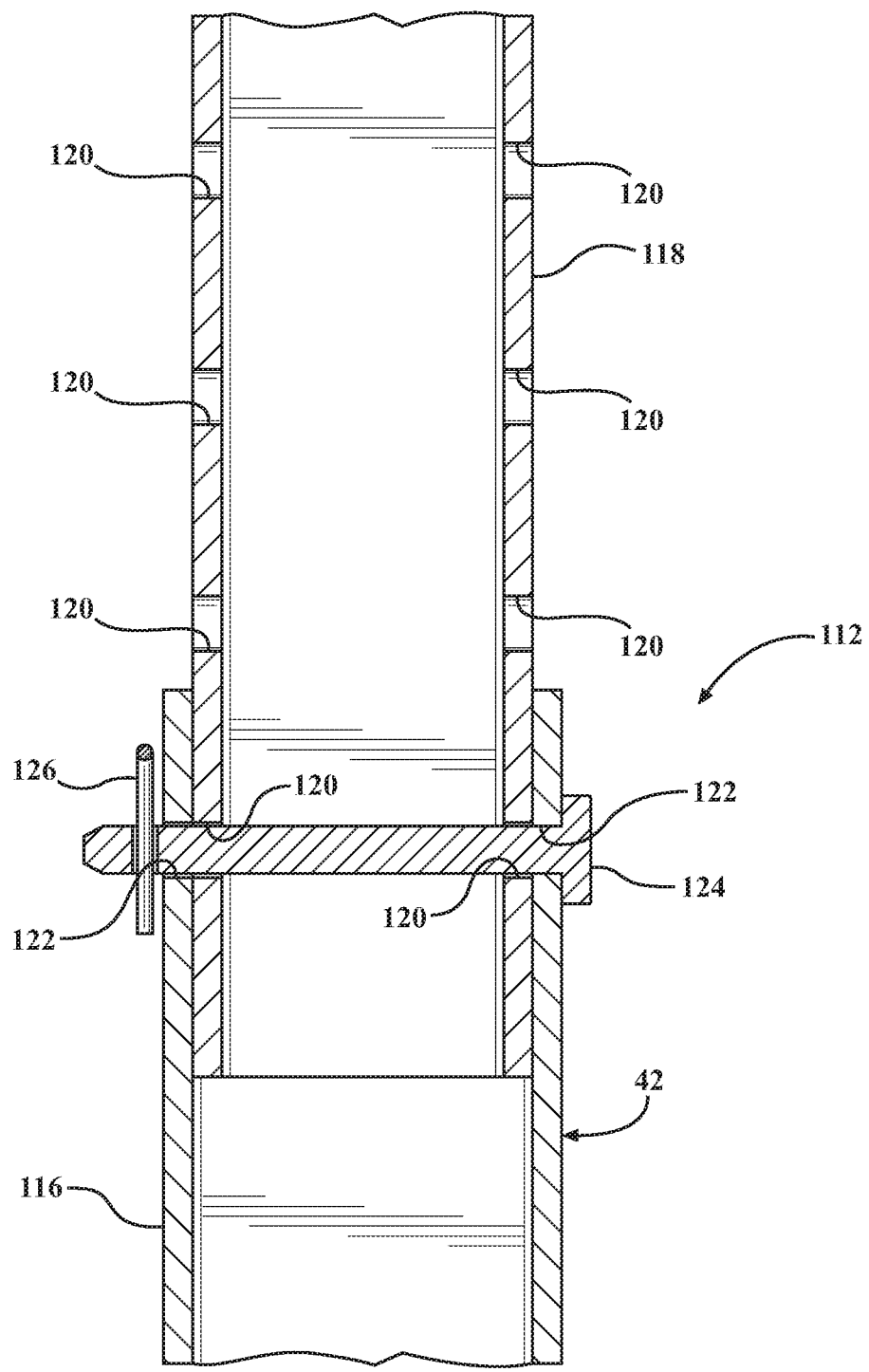
FIG. 9 is a partial cross-sectional view of a telescoping mechanism for adjusting a position of the support bracket between a retracted position and one or more extended positions.
Figure 10:
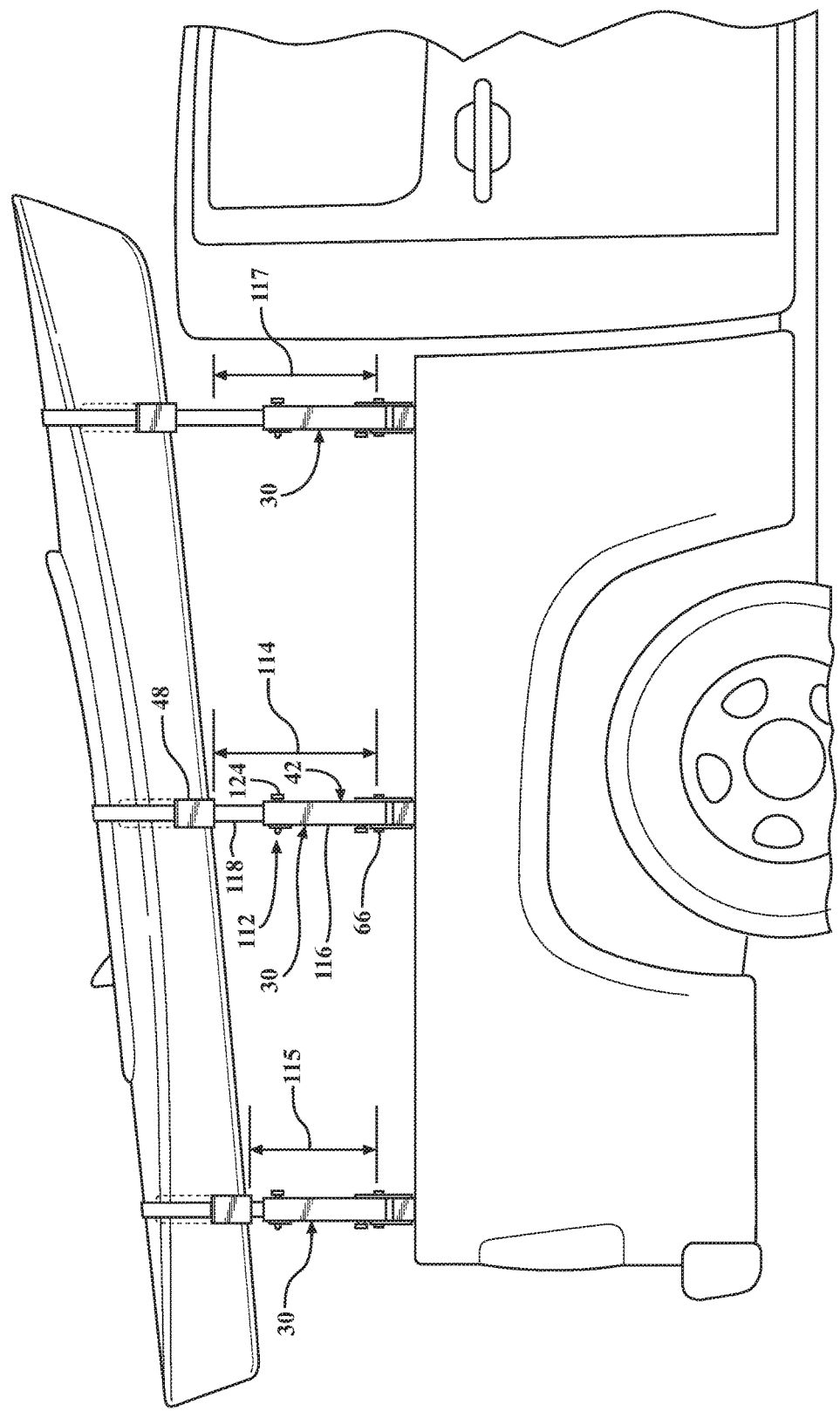
FIG. 10 is a side perspective view of the cargo rack system employing a plurality of cargo racks arranged at a different extended positions.

With reference to FIGS. 9 and 10, rack arm 42 may include a telescoping mechanism 112 that enables a distance 114 between cargo support bracket 48 and pivot shaft 66 to be selectively adjusted between a retracted position, in which cargo support bracket 48 is spaced a retracted distance 115 from pivot shaft 66, an extended position, in which cargo support bracket 48 is positioned an extended distance 117 from pivot shaft 66. Rack arm 42 may include a first rack arm member 116 pivotally connected to pivot shaft 66 and a second rack arm member 118 fixedly connected to cargo support bracket 48. Second rack arm member 118 may be slidably disposed within first rack arm member 116. Second rack arm member 118 may include multiple pairs of co-aligned thru apertures 120 located along a length of second rack arm member 118. Each thru aperture 120 of a pair of thru apertures is located on an opposite side of second rack arm member 118 from the other thru aperture of the pair. Each pair of thru apertures 120 in second rack arm member 118 may be aligned with a corresponding pair of thru apertures 122 in first rack arm member 116 to selectively adjust the location of cargo support bracket 48 relative to pivot shaft 66.

A telescoping mechanism locking pin 124 may be used to retain cargo support bracket 48 in a selected position relative to pivot shaft 66. Telescoping mechanism locking pin 124 may be inserted thru the pair of thru apertures 122 in first rack arm member 116 and the selected pair of co-aligned thru apertures 120 in second rack arm member 118 to lock cargo support bracket 48 in the selected position. A fastener, such as a spring clip 126, may be used to secure telescoping mechanism locking pin 124 to first rack arm member 116.

With reference to FIGS. 5 and 6, cargo support bracket 48 may be configured to transport different types of cargo using a single cargo support bracket configuration. For example, cargo support bracket 48 may be used to transport kayak 26 when rack arm 42 is arranged in the first transport position (see for example FIG. 3) and to transport boat 28 when rack arm 42 is arranged in the second travel position (see for example FIG. 4). Cargo support bracket 48 may have a generally U-shaped configuration, and include a first support arm 128 attached to and extending radially outward from rack arm 42, and a second support arm 130 also attached to and extending radially outward from rack arm 42. Second support arm 130 may be arranged diametrically opposite first support arm 128. First and second support arms 128 and 130 may each curve generally upward when rack arm 42 is arranged in the first travel position, as shown, for example, in FIG. 3. A cargo strap 131 may be provided for securing cargo to cargo support bracket 48.

First and second support arms 128 and 130 may have different lengths to enable cargo rack system 20 to transport cargo of differing sizes and shapes using a single cargo support bracket configuration. For example, first support arm 128 may have a length 132 that is greater than a length 134 of second support arm 130. The longer first support arm 128 may be arranged outboard (relative to vehicle 22) of the shorter second support arm 130 when transporting smaller cargo, such as kayak 26, with rack arm 42 arranged in the first travel position (as shown, for example, in FIG. 3), and may be arranged inboard of the second support arm 130 when transporting larger cargo, such as boat 28, with rack arm 42 arranged in the second travel position (as shown, for example, in FIG. 4).

Figure 11:
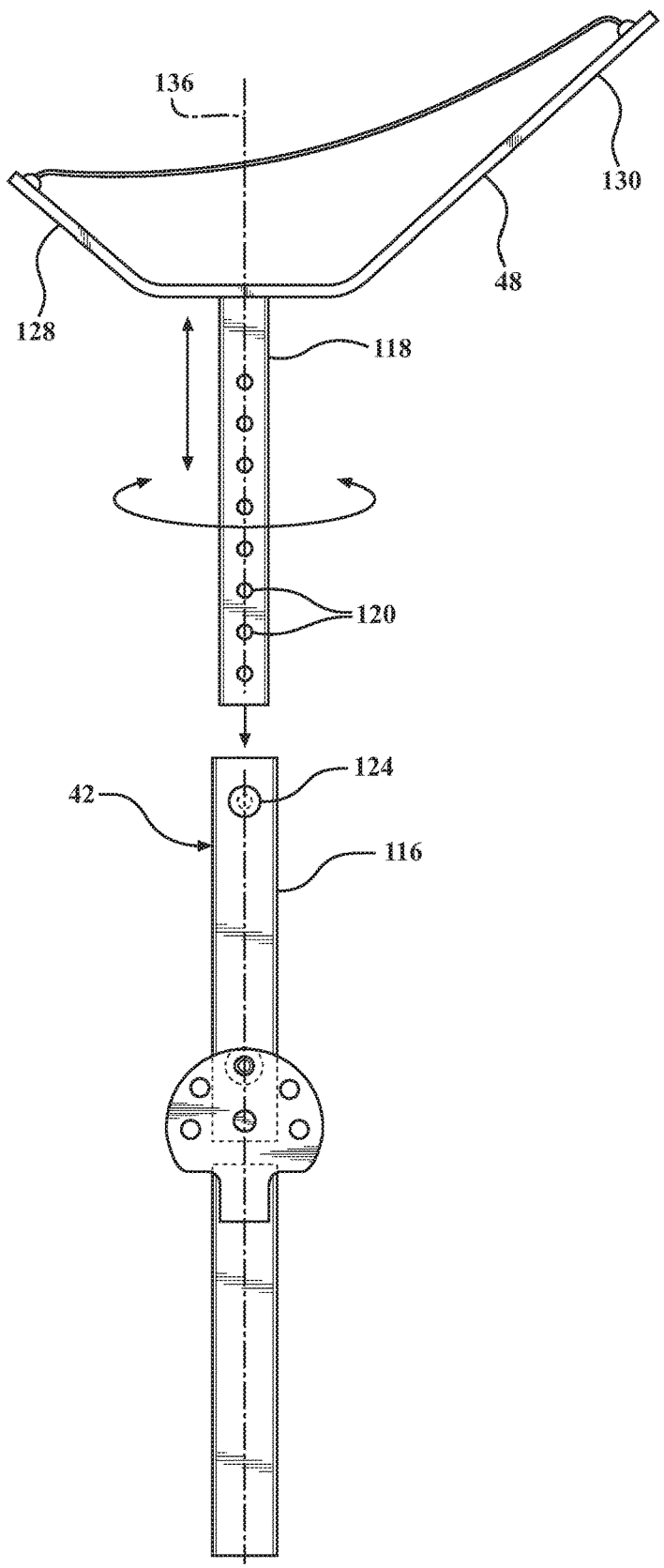
FIG. 11 is a side elevational view of the cargo rack illustrating a method for adjusting the orientation of the support bracket between the first and second support bracket positions.

With reference to FIGS. 9 and 11, an orientation of the first and second support arms 128 and 130 may be modified by selective adjusting an orientation of cargo support bracket 48 relative rack arm 42. Cargo support bracket 48 may be arranged in a first orientation, in which the longer first support arm 128 is arranged outboard of the shorter second support arm 130 (as illustrated, for example, in FIG. 3), and a second orientation, in which the longer first support arm 128 is arranged inboard of the shorter second support arm 130 (as illustrated, for example, in FIG. 4). The orientation of cargo support bracket 48 may be adjusted by unclipping spring clip 126 from telescoping mechanism locking pin 124 and disengaging the telescoping mechanism locking pin 124 from first rack arm member 116. This allows second rack arm member 118 to be withdrawn from first rack arm member 116 and rotated 180 degrees about a longitudinal axis 136 of rack arm 42 so as to be arranged in a mirror opposite orientation of its previous orientation. With cargo support bracket 48 arranged in a desired orientation, second rack arm member 118 may be reassembled to first rack arm member 116 and locked in place with telescoping mechanism locking pin 124.

Figure 12:
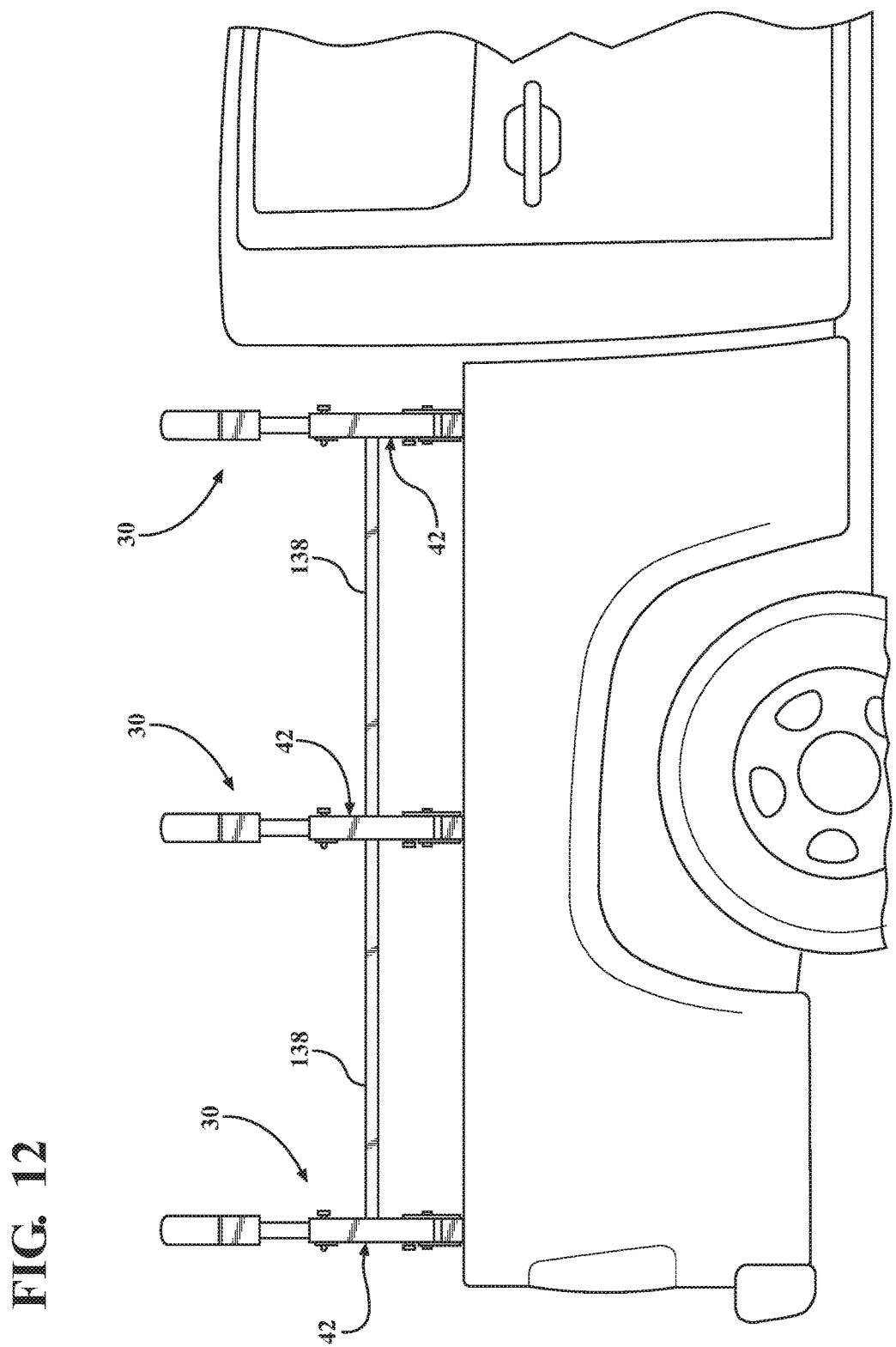
FIG. 12 is a side perspective view of an alternately configured cargo rack system employing a transverse connector bar interconnecting rack arms of adjacent cargo racks.

With reference to FIG. 12, to facilitate moving rack arm 42 between the various operating positions, a transverse connector bar 138 may be used to interconnect rack arms 42 of adjacent cargo racks 30. Transverse connector bar 138 enables the interconnected rack arms 42 to move in unison, which may make it easier and more convenient to move rack arms 42 between the various operating positions.

Figure 2:
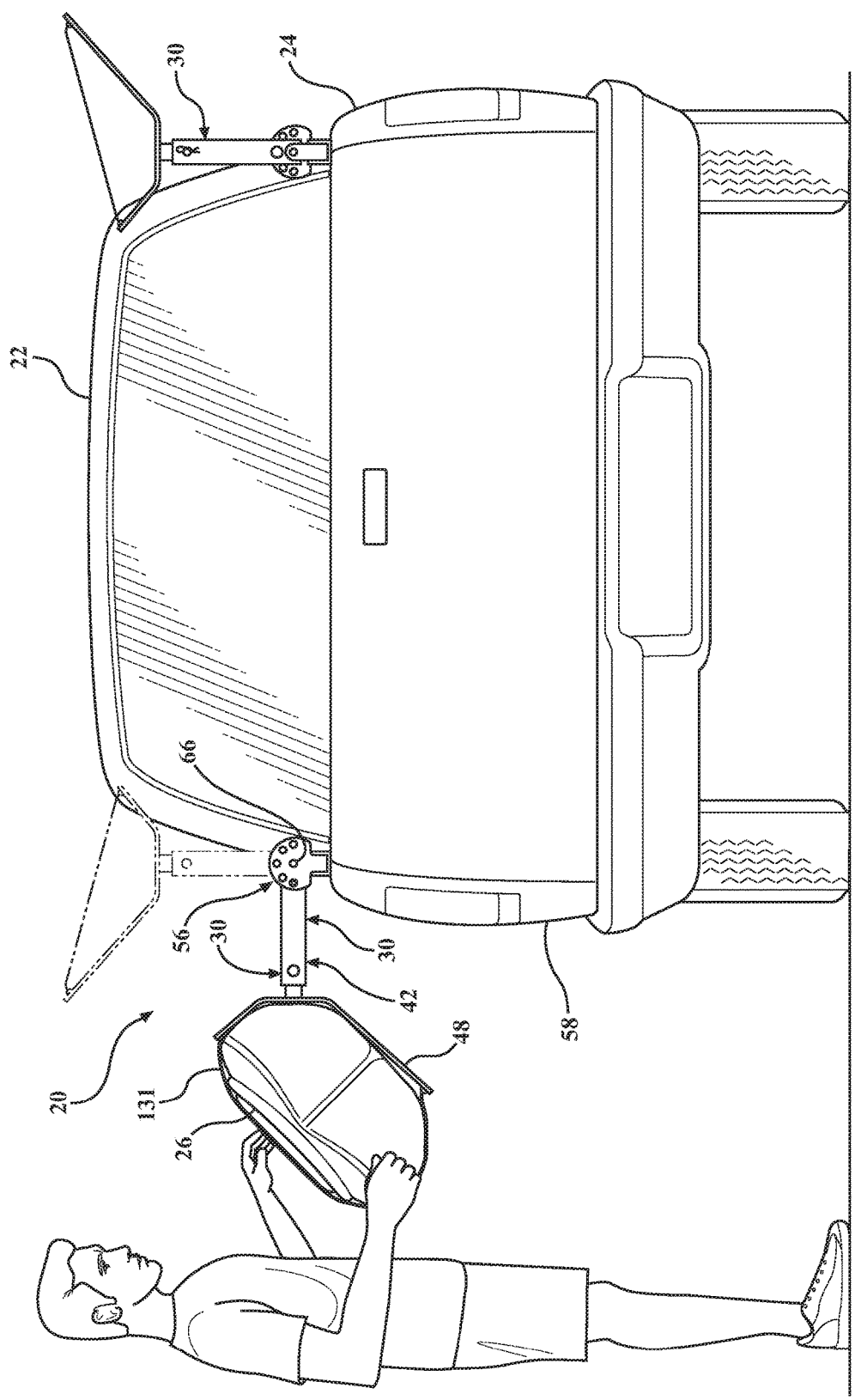
FIG. 2 is a schematic illustration of the cargo rack system arranged in a loading position with a support bracket arranged in a first support bracket orientation.

With reference to FIGS. 2 and 3, when transporting smaller cargo, such as kayak 26, cargo support bracket may be arranged in the first support bracket orientation with the longer first support arm 128 arranged outboard of the shorter second support arm 130. To facilitate loading cargo onto cargo support bracket 48, rack arm 42 may be moved to the loading position (illustrated in FIG. 2), by moving pivot locking pin to the unlocked position (see FIG. 8) and pivoting rack arm 42 outboard of vehicle 22 and downward. The orientation of cargo support bracket 48 relative to the rack arm 42 and a location of pivot shaft 66 relative to vehicle 22 remain substantially constant when pivoting rack arm 42 between the loading position and the first travel position. With rack arm 42 arranged in the loading position, the cargo maybe loaded onto cargo support bracket 48 and secured in place with cargo strap 131. Rack arm 42 may then be pivoted upright to the first travel position and secured in place by engaging locking pin shaft 80 with pivot detent 86 in pivot indexing plate 60 (see FIG. 7).

With reference to FIG. 4, when transporting larger cargo, such as boat 28, cargo support bracket 48 may be arranged in the second support bracket orientation with the longer first support arm 128 arranged inboard of the shorter second support arm 130. To provide support for the cargo generally over a center of vehicle 22, rack arm 42 may be arranged in the second travel position by moving pivot locking pin to the unlocked position (see FIG. 8) and pivoting rack arm inboard of vehicle 22. Arranging rack arm 42 in the second travel position will minimize a distance between corresponding first support arms 128 on cargo racks 30 located across from one another on opposite sides of vehicle 22. For example, with rack arm 42 arranged in the first travel position and the cargo support bracket 48 arranged in the second orientation, as illustrated in phantom in FIG. 4, the first support arms 128 of two cargo racks 30 attached to opposite sides of vehicle 22 are separated by a first distance 140. Pivoting rack arm 42 from the first travel position to the second travel position decreases the distance between first support arms 128, which are now located at a smaller second distance 142. Arranging rack arm 42 in the second travel position enables first support arm 128 to provide a platform for supporting the cargo generally over a center of vehicle 22.

It is intended that the scope of the present methods and apparatuses be defined by the following claims. However, it must be understood that the disclosed systems and methods may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. An adjustable cargo rack for a vehicle, the cargo rack comprising:
   a mount connectable to the vehicle;
   a pivot shaft attached to the mount;
   a rack arm having a proximal end connected to the pivot shaft and an opposite distal end, the rack arm selectively pivotable between a loading position, wherein the rack arm extends outboard of an outermost point of a lateral side of the vehicle when the cargo rack is attached to the vehicle, and a first travel position; and a cargo support bracket attached to the distal end of the rack arm, wherein an orientation of the cargo support bracket relative to the rack arm and a location of the pivot shaft relative to the vehicle remain substantially constant when pivoting the rack arm between the loading position and the first travel position.

2. The cargo rack of claim 1, wherein the rack arm includes a first rack arm member connected to the pivot shaft and a second rack arm member connected to the cargo support bracket, the second rack arm member selectively positionable relative to the first rack arm member.

3. The cargo rack of claim 2, wherein an orientation of the cargo support bracket relative to the first rack arm member is selectively adjustable between a first orientation and second orientation, the cargo support bracket being arranged in mirror opposite orientation when arranged in second orientation as opposed to when arranged in the first orientation.

4. The cargo rack of claim 2, wherein the second rack arm member is slidably disposed within the first rack arm member.

5. The cargo rack of claim 2, wherein the cargo support bracket is selectively positionable between a retracted position, in which the cargo support bracket is spaced a retracted distance from the pivot shaft, and an extended position, in which the cargo support bracket is spaced an extended distance from the pivot shaft, wherein the extended distance is greater than the retracted distance.

6. The cargo rack of claim 1, wherein the cargo support bracket includes a first support arm extending radially outward from the rack arm and a second support arm extending radially outward from the rack arm and positioned diametrically opposite the first support arm, wherein a length of the first support arm is greater than a length of the second support arm.

7. The cargo rack of claim 6, wherein the rack arm is positionable in a second travel position in which the rack arm extends inboard of the outermost point of the lateral side of the vehicle when the cargo rack is attached to the vehicle and an orientation of the cargo support bracket is selectively adjustable relative to the rack arm, such that the first support arm is arranged inboard the second support arm relative to the vehicle when the rack arm is arranged in the second travel position and the first support arm is arranged outboard the second support arm relative to the vehicle when the rack arm is arranged in the first travel position.

8. The cargo rack of claim 1 further comprising a pivot mechanism pivotably connecting the rack arm to the mount, the pivot mechanism comprising:
a pivot indexing plate fixedly attached to the mount and including a plurality of spaced apart pivot detents, the pivot shaft pivotably connecting the rack arm to the pivot indexing plate; and
a pivot locking pin connected to the rack arm and selectively engageable with the pivot detents, the pivot detents including at least a first pivot detent for maintaining the rack arm in the first travel position when engaged by the pivot locking pin and a second pivot detent for maintaining the rack arm in a second travel position when engaged by the pivot locking pin.

9. The cargo rack of claim 1, further comprising:
a first rack arm;
a second rack arm spaced apart from the first rack arm; and a transverse connector bar having one end attached to the first rack arm and an opposite end attached to the second rack arm.

10. An adjustable cargo rack for a vehicle, the cargo rack comprising:
a mount connectable to the vehicle;
a rack arm having a proximal end pivotably connected to the mount, the rack arm selectively pivotable between a loading position, wherein the rack arm extends outboard of an outermost point of a lateral side of the vehicle when the cargo rack is attached to the vehicle, and a first travel position; and
a cargo support bracket detachably connected to a distal end of the rack arm opposite the proximal end, wherein the cargo support bracket is adjustable about a longitudinal axis of the rack arm between a first support bracket orientation and a second support bracket orientation.

11. The cargo rack of claim 10, wherein the cargo support bracket includes a first support arm extending radially outward from the rack arm and a second support arm extending radially outward from the rack arm and positioned diametrically opposite the first support arm, a length of the first support arm being greater than a length of the second support arm, the first support arm arranged outboard the second support arm relative to the vehicle when the cargo support bracket is arranged in the first support bracket orientation and the first support arm arranged inboard the second support arm relative to the vehicle when the cargo support bracket is arranged in the second support bracket orientation.

12. The cargo rack of claim 11, wherein the rack arm includes a first rack arm member pivotably connected to the mount and a second rack arm member fixedly connected to the cargo support bracket and adjustably connected to the first rack arm member, the second rack arm member selectively detachable from the first rack arm member for adjusting an orientation of the cargo support bracket between the first and second support bracket orientations.

13. The cargo rack of claim 11, wherein the rack arm is selectively pivotable to a second travel position in which the rack arm extends inboard the outermost point of the lateral side of the vehicle when the cargo rack is attached to the vehicle, the cargo support bracket arranged in the second support bracket orientation when the rack arm is positioned in the second travel position.

14. The cargo rack of claim 13, wherein the cargo support bracket is arranged in the first support bracket orientation when the rack arm is positioned in the loading position.

15. The cargo rack of claim 10, further comprising a pivot mechanism pivotably connecting the rack arm to the mount, the pivot mechanism comprising:
a pivot indexing plate fixedly attached to the mount and including a plurality of spaced apart pivot detents;
a pivot shaft pivotably connecting the rack arm to the pivot indexing plate; and
a pivot locking pin connected to the rack arm and selectively engageable with the pivot detents, the pivot detents including at least a first pivot detent for maintaining the rack arm in the first travel position when engaged by the pivot locking pin and a second pivot detent for maintaining the rack arm in a second travel position when engaged by the pivot locking pin.

16. The cargo rack of claim 15, wherein the rack arm includes a first rack arm member pivotably connected to the mount and a second rack arm member fixedly connected to the cargo support bracket and slidably connected to the first rack arm member, the cargo support bracket selectively positionable between a retracted position, in which the cargo support bracket is spaced a retracted distance from the pivot shaft, and an extended position, in which the cargo support bracket is spaced an extended distance from the pivot shaft, wherein the extended distance is greater than the retracted distance.

17. A cargo rack system for a vehicle, the cargo rack system comprising:
   a first cargo rack connectable to the vehicle along a first side of the vehicle and a second cargo rack connectable to the vehicle along a second side of the vehicle opposite the first side, each of the first and second cargo racks comprising:
   a mount connectable to the vehicle;
   a rack arm having a proximal end pivotably connected to the mount and an opposite distal end, the rack arm selectively pivotable between a first travel position and a second travel position; and
   a cargo support bracket attached to the distal end of the rack arm, the cargo support bracket including a first support arm extending radially outward from the rack arm and including a proximal end attached to the rack arm and an opposite distal end, and a second support arm extending radially outward from the rack arm and positioned diametrically opposite the first support arm, the second support arm including a proximal end attached to the rack arm and an opposite distal end; and
   wherein the distal end of the first support arm of the first cargo rack is spaced a first distance from the distal end of the first support arm of the second cargo rack when the rack arm of the first cargo rack and the rack arm of the second cargo rack are both positioned in the first travel position, and the distal end of the first support arm of the first cargo rack is spaced a second distance from the distal end of the first support arm of the second cargo rack when the rack arm of the first cargo rack and the rack arm of the second cargo rack are both positioned in the second travel position, wherein the first distance is greater than the second distance.

18. The cargo rack system of claim 17, wherein a length of the first support arm is greater than a length of the second support arm.

19. The cargo rack system of claim 17, further comprising a pivot mechanism pivotably connecting the rack arm to the mount, the pivot mechanism comprising:
   a pivot indexing plate fixedly attached to the mount and including at least a first pivot detent for maintaining the rack arm in the first travel position and a second pivot detent for maintaining the rack arm in the second travel position;
   a pivot shaft pivotably connecting the rack arm to the pivot indexing plate; and
   a pivot locking pin connected to the rack arm and selectively engageable with the first and second pivot detents.

20. The cargo rack system of claim 19, wherein the pivot locking pin engages the first pivot detent when the rack arm is positioned in the first travel position and the second pivot detent when the rack arm is positioned in the second travel position.

* * * * *